Dec. 16, 1958  G. C. REISER  2,864,608
SHOCK ABSORBING PLATFORM FOR WEIGHING SCALES
Filed Feb. 5, 1954  5 Sheets-Sheet 1
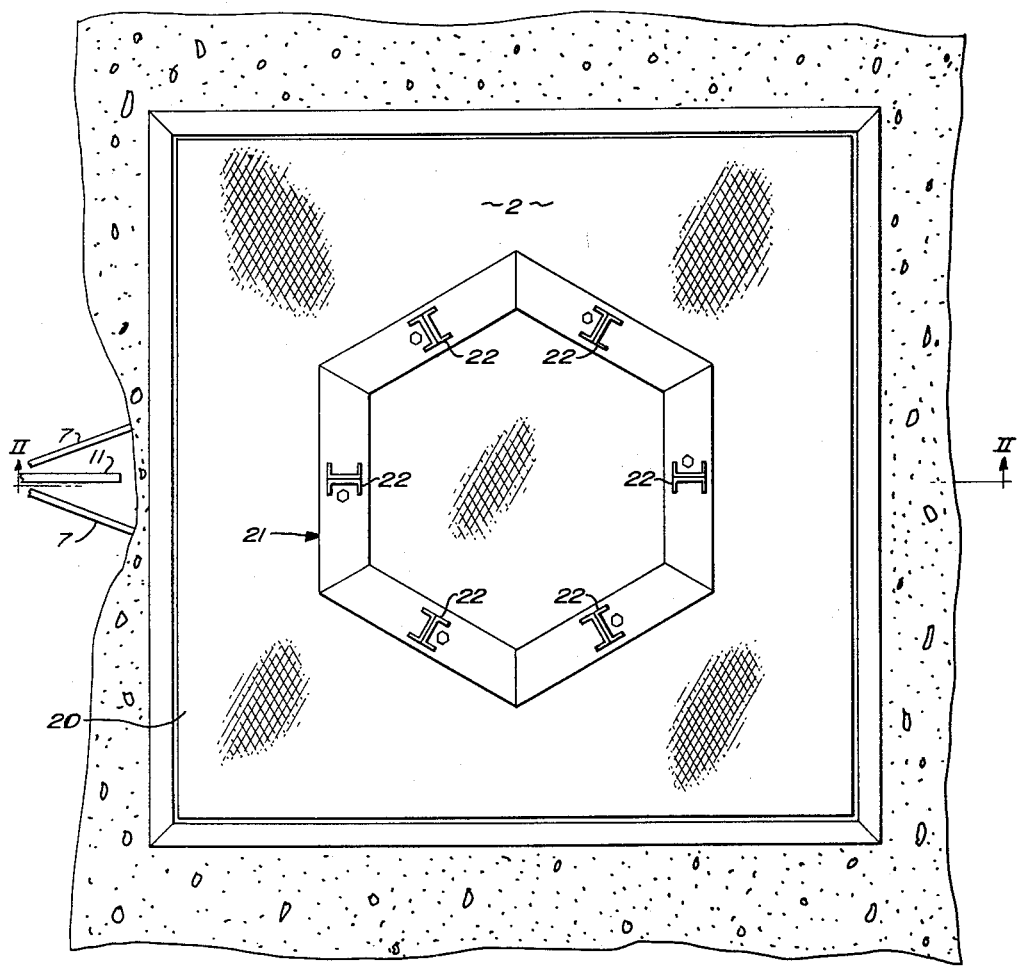
Fig. I
INVENTOR.
GEORGE C. REISER
BY
Marshall, Marshall & Yeasting
ATTORNEYS Dec. 16, 1958 G. C. REISER 2,864,608
SHOCK ABSORBING PLATFORM FOR WEIGHING SCALES
Filed Feb. 5, 1954 5 Sheets-Sheet 2
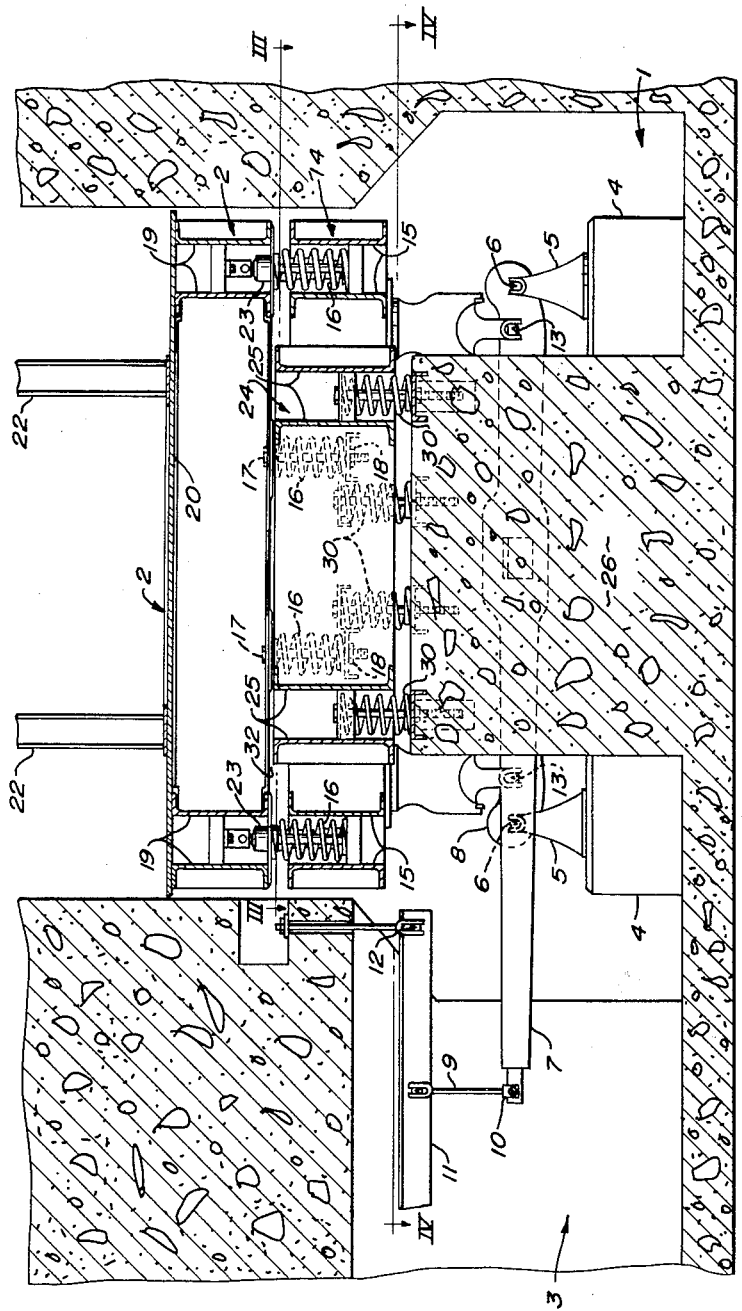
INVENTOR.
GEORGE C. REISER
BY
Marshall, Marshall & Heasting
ATTORNEYS

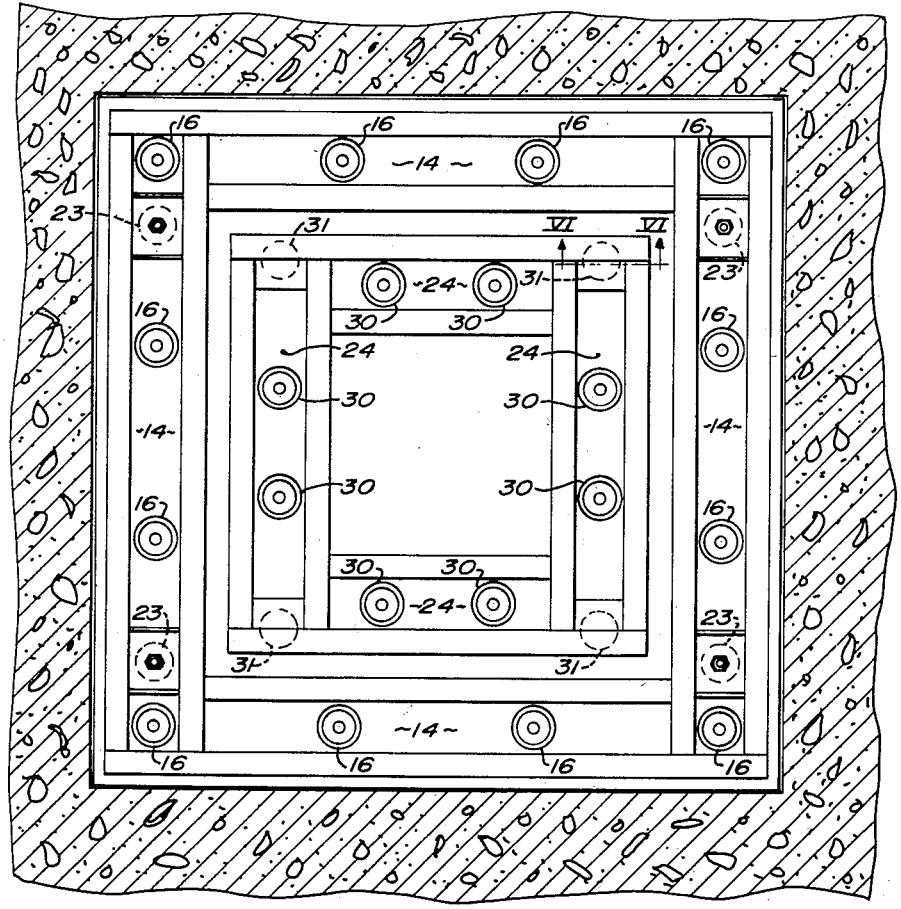
Fig. III
INVENTOR.
GEORGE C. REISER

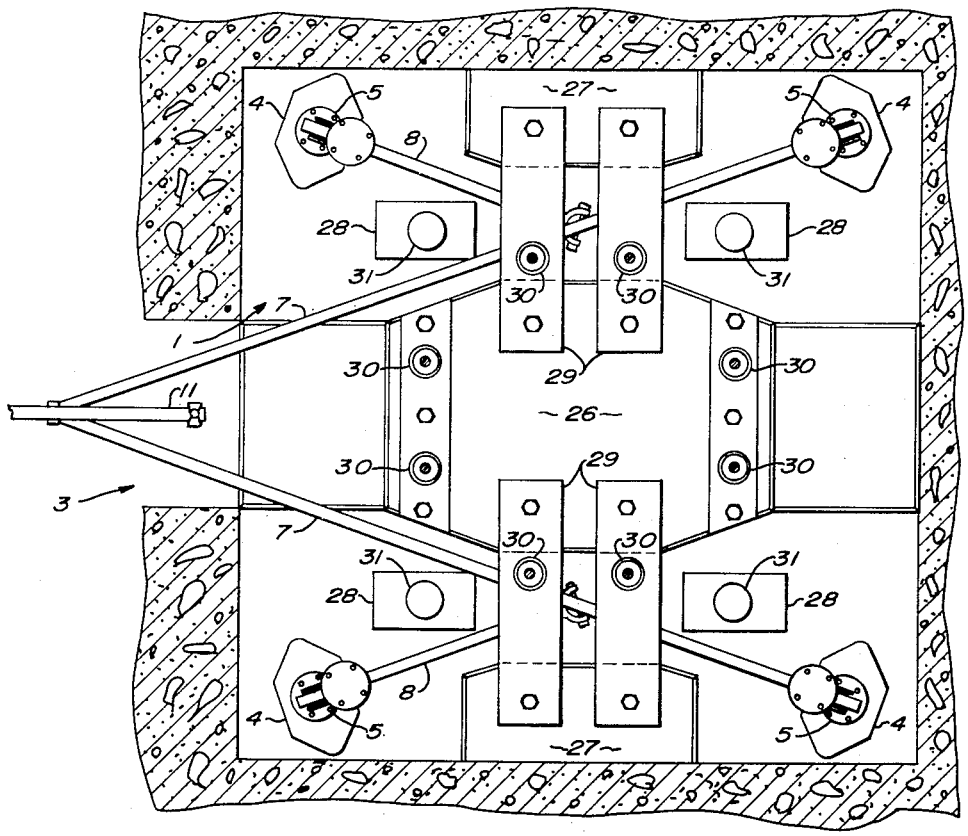
Fig. IV

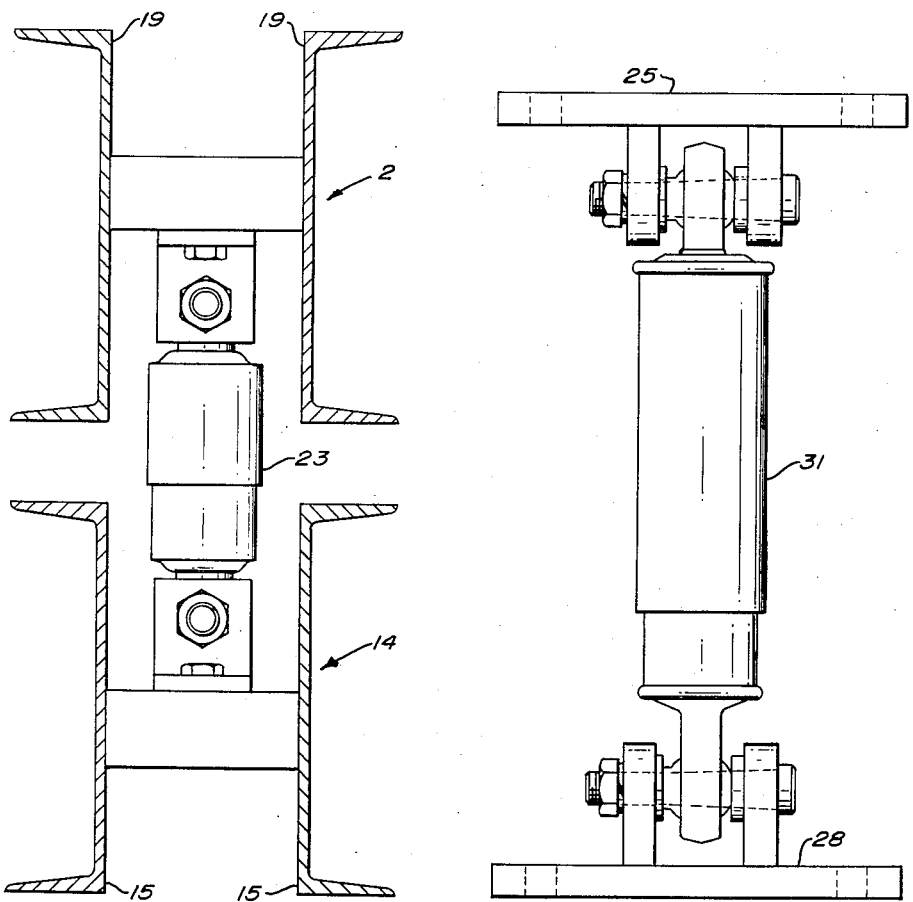

United States Patent Office 2,864,608
Patented Dec. 16, 1958

2,864,608

SHOCK ABSORBING PLATFORM FOR WEIGHING SCALES

George C. Reiser, Toledo, Ohio, assignor, by mesne assignments, to Toledo Scale Corporation, Toledo, Ohio, a corporation of Ohio Application February 5, 1954, Serial No. 408,363

8 Claims. (Cl. 265—71)

This invention relates to weighing scales and in particular to heavy duty shock absorbing scales.

In weighing scales of this type, a load is often dropped onto the load receiver. If the load is comparatively light in weight, the internal dampening from the levers, the load receiver or hopper, and the structural steel may be enough to prevent damage to the weighing mechanism of the scale. To permit larger loads to be dropped onto the load receiver without damage to the weighing mechanism, scales have been equipped with shock absorbing mountings employing springs or rubber cushions for the load receiver to supplement the internal dampening of the scale. Heretofore, the weighing mechanism of such scales, even though the scales were equipped with shock absorbing mountings employing springs or rubber cushions for the load receiver, often was damaged when suddenly applied loads caused the load receiver, supported by resilient means from the weighing mechanism, to rebound.

The principal object of this invention is to provide, in a weighing scale having resilient means supporting the load receiver from the weighing mechanism, rebound absorbing means connecting the load receiver to the weighing mechanism.

Another object of the invention is to provide, in a weighing scale having resilient means supporting the load receiver from the weighing mechanism, rebound absorbing means connecting the load receiver to the weighing mechanism, a resiliently mounted auxiliary frame for supporting the load receiver when said resilient means are substantially activated, and a second rebound absorbing means to dampen the rebound of the resiliently mounted auxiliary frame when the auxiliary frame supports the load receiver.

Other objects and advantages will be apparent from the following description in which reference is had to the accompanying drawings.

According to the invention, a plurality of springs are interposed between a load receiver of a weighing scale and a load receiver supporting frame carried by the weighing mechanism of the scale. Means are provided for preloading the plurality of springs so as to render them active only when a force greater than the capacity of the weighing scale is applied to the load receiver and rebound absorbing means are provided operatively connecting the load receiver and the load receiver supporting frame to dampen the rebound of the load receiver when the plurality of springs are activated. A resiliently mounted auxiliary frame is located below the load receiver and supports the load receiver when the plurality of springs interposed between the load receiver and the load receiver supporting frame are substantially activated. A second rebound absorbing means is operatively connected to the auxiliary frame to dampen the rebound of the auxiliary frame when the auxiliary frame supports the load receiver.

In the drawings:

Figure I is a plan view of a load receiver supported from the levers of a shock absorbing weighing scale having its weighing mechanism located in a pit, part of the covering of the pit broken away to show the levers.

Figure II is a vertical sectional view taken along line II—II of Figure I.

Figure III is a horizontal sectional view taken along line III—III of Figure II.

Figure IV is a horizontal sectional view taken along line IV—IV of Figure II.

Figure V is an enlarged view of one end of the load receiver and its support shown in Figure II with the spring removed to show all of the shock absorber.

Figure VI is an elevational view taken along the line VI—VI of Figure III.

These specific figures and the accompanying description are intended merely to illustrate the invention but not to limit its scope.

The mechanism of the invention is shown erected in a pit 1 of heavy concrete which is covered by a load receiver 2 and has an extension 3 covered by a deck, upon which is placed a cabinet (not shown) housing load counterbalancing mechanism and indicating means.

Suitably mounted upon concrete piers 4 which are level and in the same plane within the pit 1 are fulcrum stands 5 which support the fulcrum pivots 6 of a pair of long levers 7 and a pair of short levers 8 connected thereto. A load on each of the four levers acts upon a tension rod 9 which supports the noses of the long levers 7 by stirrups 10. Acting through a shelf lever 11 hung in a fulcrum stirrup 12, the tension rod 9 transmits the pull to a second rod (not shown) operatively connected to the load counterbalancing mechanism within the cabinet.

Upon each of the four levers is a pair of load pivots 13 which support a load receiver supporting frame 14 comprising a plurality of channels 15 welded together to form a rectangular open framework. The load receiver supporting frame 14 supports in turn the load receiver 2 through a plurality of cushioning coil springs 16 interposed between the load receiver and the load receiver supporting frame. The coil springs 16 are preloaded by means of bolts 17 with cooperating nuts 18 so as to render them active only when a force greater than the capacity of the weighing scale is applied to the load receiver 2. That is, the plurality of coil springs 16 are compressed by means of the bolts 17 and their nuts 18 to a point where the load receiver 2 and the load receiver supporting frame 14 act as one solid structure when forces less than the capacity of the weighing scale are applied to the load receiver 2.

The load receiver 2 comprises a plurality of channels 19 welded together to form a rectangular open framework covered with a steel platform plate 20. A hopper 21 is bolted to the platform plate 20 and has its load receiving opening located below the normal floor level. Loads are dropped from dump trucks or cranes into the hopper 21. After the load is weighed, handtrucks are run between the I-beam supports 22 of the hopper 21 to unload the hopper.

When loads are dropped into the hopper 21 which cause forces less than the capacity of the weighing scale to be applied to the load receiver 2, the load receiver 2 and the load receiver supporting frame 14 move downwardly as one solid structure upon the load supporting levers 7 and 8. When loads cause forces greater than the capacity of the weighing scale to be applied to the load receiver 2, the plurality of coil springs 16 are activated, i. e. the springs are compressed beyond the point where they are already compressed by the preloading bolts 17 to cushion the shocks of impact to prevent transmission of the shocks to the delicate scale parts. The springs 16 then expand to the limiting position defined by the preloading bolt 17 causing the load receiver 2 to rebound.

To dampen the rebound of the load receiver when the plurality of springs 16 are activated, a plurality of hydraulic shock mounts or hydraulic shock absorbers 23 are provided to prevent damage to the delicate scale parts. The hydraulic shock mounts 23 are located one under each corner of the load receiver 2 and operatively connect the load receiver 2 to the load receiver supporting frame 14. The hydraulic shock mounts 23 are of a type which offer little resistance to downwardly directed forces but which effectively dampen the upward rebound of the load receiver 2 when the plurality of coil springs 16 are activated.

When very heavy loads are dropped into the hopper 21, additional shock absorbing structure is needed. This additional structure is in the form of an auxiliary frame 24 comprising a plurality of channels 25 welded together to form a rectangular open framework. The auxiliary frame 24 is resiliently supported from a concrete and steel pier structure built in the bottom of the pit 1 which structure comprises a large concrete pier 26 located in the center of the pit 1, a pair of smaller concrete piers 27 located one in each side of the pit 1, and four spaced apart small concrete piers 28. Heavy steel plates 29 join the piers 26 and 27. A plurality of large coil springs 30 are attached some to the large center concrete pier 26 and the remainder to the heavy steel plates 29. The coil springs 30 resiliently support the auxiliary frame 24 and are assisted in this support by four hydraulic shock mounts or hydraulic shock absorbers 31 interposed between the spaced apart small concrete piers 28 and the bottoms of the channels 25 of the auxiliary frame 24. The coil springs 30 are preloaded by means of the same kind of bolt and nut arrangement as are the coil springs 16. However, whereas the coil springs 16 are preloaded so as to render them active only when a force greater than the capacity of the weighing scale is applied to the load receiver 2, the coil springs 30 are preloaded so as to render them active when a force less than the capacity of the weighing scale is applied to the auxiliary frame 24. The hydraulic shock mounts 31 dampen the rebound of the auxiliary frame 24 caused by the action of the coil springs 30 in the same manner as the hydraulic shock mounts 23 dampen the rebound of the load receiver 2 caused by the action of the coil springs 16.

The auxiliary frame 24 is located within the rectangular open load receiver supporting frame 14 and directly below the load receiver 2 and normally contacts neither. However, a clearance 32 between the bottom of the load receiver 2 and the top of the auxiliary frame 24 is very small. When loads are dropped into the hopper 21 which cause forces greater than the capacity of the weighing scale to be applied to the load receiver 2 and the plurality of coil springs 16 are substantially activated, i. e. activated enough to cause the clearance 32 to close, the load receiver 2 moves downwardly to close the clearance 32 and the auxiliary frame then serves as a temporary cushioning support for the load receiver 2 until the coil springs 16 again support the load receiver 2 out of contact from the auxiliary frame 24.

Various changes may be made in the details of construction without departing from the spirit and scope of the invention.

Having described the invention, I claim:

1. In a weighing scale, in combination, weighing mechanism, a load receiver supporting frame carried by said weighing mechanism, a load receiver, a plurality of springs interposed between said load receiver and said load receiver supporting frame, means for preloading said plurality of springs so as to render them active only when a force greater than the capacity of the weighing scale is applied to the load receiver, a first rebound absorbing means operatively connecting said load receiver and said load receiver supporting frame to dampen the rebound of the load receiver when said plurality of springs are activated, a resiliently mounted auxiliary frame below said load receiver, said auxiliary frame supporting said load receiver when said plurality of springs are substantially activated, and a second rebound absorbing means operatively connected to said auxiliary frame to dampen the rebound of the resiliently mounted auxiliary frame when said auxiliary frame supports said load receiver.

2. The combination according to claim 1 wherein the auxiliary frame is resiliently mounted by means comprising a plurality of preloaded coil springs, said springs so preloaded as to permit them to be activated when a force less than the capacity of the weighing scale is applied to the auxiliary frame.

3. The combination according to claim 1 wherein the first rebound absorbing means and the second rebound absorbing means comprise a plurality of hydraulic shock absorbers.

4. In a weighing scale, in combination, a base, weighing mechanism supported by the base, a load receiver supporting frame carried by the weighing mechanism, a load receiver, cushioning means operatively connecting the load receiver and the load receiver supporting frame, the load receiver supporting frame defining an opening below the load receiver, an auxiliary frame that is supported by the base within the opening at about the same elevation as the load receiver supporting frame and that normally is spaced from the load receiver, the auxiliary frame serving to temporarily support the load receiver whenever the cushioning means are operated enough by relatively large load force upon the load receiver to close said space, and rebound absorbing means operatively connecting the load receiver and the load receiver supporting frame.

5. The combination according to claim 4 wherein the auxiliary frame is resiliently supported and additional rebound absorbing means operatively connect the auxiliary frame to the base.

6. In a weighing scale, in combination, a base, weighing mechanism supported by the base, a load receiver supporting frame carried by the weighing mechanism, a load receiver, cushioning means operatively connecting the load receiver and the load receiver supporting frame, the load receiver supporting frame defining an opening below the load receiver, an auxiliary frame that is resiliently supported by the base within the opening and that normally is spaced slightly from the load receiver, the auxiliary frame serving to temporarily support the load receiver whenever the cushioning means are operated enough by relatively large load force upon the load receiver to close said space, and rebound absorbing means operatively connecting the load receiver and the load receiver supporting frame.

7. The combination according to claim 6 wherein additional rebound absorbing means operatively connect the auxiliary frame to the base.

8. The combination according to claim 7 wherein the rebound absorbing means include a plurality of hydraulic shock absorbers.

References Cited in the file of this patent

UNITED STATES PATENTS

| | | |
|---|---|---|
| 837,496 | Osborne | Dec. 4, 1906 |
| 916,818 | Winslow | Mar. 30, 1909 |
| 1,791,775 | Von Pein | Feb. 10, 1931 |
| 1,825,336 | Cross | Sept. 29, 1931 |
| 1,858,795 | Van Duyn | May 17, 1932 |
| 1,965,302 | Wagner | July 3, 1934 |
| 2,049,297 | Hurt | July 28, 1936 |
| 2,634,082 | Knobel | Apr. 7, 1953 |
| 2,742,278 | Carleton | Apr. 17, 1956 |
| 2,775,444 | Hadley | Dec. 25, 1956 |

FOREIGN PATENTS

| | | |
|---|---|---|
| 262,503 | Great Britain | Dec. 6, 1926 |
| 384,227 | Great Britain | Dec. 1, 1932 |
| 1,010,149 | France | Mar. 19, 1952 |